US010771242B2

(12) United States Patent
Wang et al.

(10) Patent No.: US 10,771,242 B2
(45) Date of Patent: Sep. 8, 2020

(54) BLOCKCHAIN-BASED DATA PROCESSING

(71) Applicant: Alibaba Group Holding Limited, George Town (KY)

(72) Inventors: Haibin Wang, Hangzhou (CN); Xiaotian Wang, Hangzhou (CN); Fan Zhou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/805,641

(22) Filed: Feb. 28, 2020

(65) Prior Publication Data

US 2020/0204353 A1   Jun. 25, 2020

Related U.S. Application Data

(63) Continuation of application No. PCT/CN2020/071842, filed on Jan. 13, 2020.

(30) Foreign Application Priority Data

Jul. 9, 2019   (CN) .......................... 2019 1 0615701

(51) Int. Cl.
  *H04L 29/06*   (2006.01)
  *G06F 21/64*   (2013.01)
  (Continued)

(52) U.S. Cl.
  CPC ........ *H04L 9/0643* (2013.01); *G06F 16/2358* (2019.01); *G06F 16/27* (2019.01);
  (Continued)

(58) Field of Classification Search
  CPC ... H04L 63/0815; H04L 63/08; H04L 9/0643; H04L 9/0637; H04L 29/08;
  (Continued)

(56) References Cited

U.S. PATENT DOCUMENTS 8,955,041 B2 * 2/2015 Esaki ...................... H04L 63/08
  726/1
10,587,413 B1 * 3/2020 Todd ..................... H04L 9/3247
  (Continued)

FOREIGN PATENT DOCUMENTS

CN    107341702    11/2017
CN    108550079    9/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Amir Mehrmanesh
(74) *Attorney, Agent, or Firm* — Fish & Richardson P.C.

(57) ABSTRACT

One or more embodiments of the present specification provide blockchain-based data processing methods and apparatuses that are applied to a blockchain network system that includes a node device of a service platform and a node device of a service provider. The method includes sending first transaction data by the blockchain node device of the service platform; obtaining, by the blockchain node device of the service platform, second transaction data where the second transaction data is generated by a blockchain node device of a service provider; checking whether the blockchain node device of the service platform receives the service processing data; executing predetermined service processing data acquisition logic or executing application logic for the service processing data if the blockchain node device of the service platform does not or does, respectively, receive the service processing data.

18 Claims, 7 Drawing Sheets

(51) Int. Cl.
*H04L 9/06* (2006.01)
*G06F 16/27* (2019.01)
*G06F 16/23* (2019.01)
*H04L 29/08* (2006.01)

(52) U.S. Cl.
CPC ............ *G06F 21/64* (2013.01); *H04L 9/0637* (2013.01); *H04L 29/08* (2013.01); *H04L 2209/38* (2013.01)

(58) Field of Classification Search
CPC ... H04L 2209/38; G06F 21/41; G06F 21/604; G06F 16/27; G06F 16/2358; G06F 21/64; G06Q 40/04; G06Q 20/38; G06Q 20/06
See application file for complete search history.

(56) References Cited

U.S. PATENT DOCUMENTS

| | | | | |
|---|---|---|---|---|
| 2013/0247142 | A1* | 9/2013 | Nishizawa | ............ G06F 21/604 726/1 |
| 2015/0310497 | A1 | 10/2015 | Valin et al. | |
| 2018/0268405 | A1* | 9/2018 | Lopez | ................... G06Q 20/40 |

FOREIGN PATENT DOCUMENTS

| | | |
|---|---|---|
| CN | 108737361 | 11/2018 |
| CN | 109218079 | 1/2019 |
| CN | 109584082 | 4/2019 |
| CN | 109685674 | 4/2019 |
| CN | 109947845 | 6/2019 |
| CN | 109951488 | 6/2019 |
| CN | 109981588 | 7/2019 |
| CN | 110471982 | 11/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071842, dated Apr. 13, 2020, 15 pages (with partial machine translation).

* cited by examiner

| Handling record |
|---|
| - id : pk |
| - gmt_create |
| - gmt_modified |
| - Handling id |
| - External service number: number of an insurance policy or endorsement |
| - Handling type |
| - Submit a hash of the record |
| - Submit a blockchain transaction of the record: blockchain transaction |
| - Confirm the hash of the record |
| - Confirm the blockchain transaction of the record: blockchain transaction |

FIG. 3

| Insurance policy |
|---|
| - Number of the insurance policy |
| - Number of a standard product |
| - Number of an institution product |
| - Insurance cover time |
| - Policy creation time |
| - Validity time |
| - End time |
| - Insurance cancellation time |
| - State |
| - Insurance premium |
| - Insurance coverage |
| - Number of the external institution |
| - Whether confirmed by the institution: boolean |
| - Time of confirmation by the institution |

FIG. 4(a)

| Endorsement |
|---|
| - Number of the endorsement |
| - State of the endorsement |
| - Creation time of the endorsement |
| - Validity time of the endorsement |
| - Endorsement source |
| - Underwriter of the endorsement |
| - Amount of the endorsement |
| - Whether confirmed by the institution |
| - Time of the confirmation by the institution |

FIG. 4(b)

BLOCKCHAIN-BASED DATA PROCESSING

CROSS-REFERENCE TO RELATED APPLICATIONS

This application is a continuation of PCT Application No. PCT/CN2020/071842, filed on Jan. 13, 2020, which claims priority to Chinese Patent Application No. 201910615701.9, filed on Jul. 9, 2019, and each application is hereby incorporated by reference in its entirety.

TECHNICAL FIELD

The present disclosure relates to the field of data processing technologies, and in particular, to blockchain-based data processing methods and apparatuses.

BACKGROUND

A blockchain technology, also referred to as a distributed ledger technology, is an emerging technology in which several computing devices jointly participate in "bookkeeping" to maintain a complete distributed database. The blockchain technology features decentralization and transparency, each computing device can record data in the database, and the data can be synchronized rapidly between the computing devices.

SUMMARY

In view of this, one or more embodiments of the present specification provide blockchain-based data processing methods and apparatuses, and computer devices.

To achieve the previous objective, the one or more embodiments of the present specification provide the following technical solutions:

According to a first aspect of the one or more embodiments of the present specification, a blockchain-based data processing method is provided, and is applied to a blockchain network system that includes a node device of a service platform and a node device of a service provider, the node device of the service platform is communicatively connected to the node device of the service provider to transmit data, and the method includes the following: generating, by the node device of the service platform, service handling data of a target service object, where the service handling data includes an identifier of the target service object; sending, by the node device of the service platform, a first transaction to a blockchain, where the first transaction is generated based on the service handling data, and the first transaction includes the identifier of the target service object; obtaining, by the node device of the service provider, the first transaction from a block of the blockchain; checking, by the node device of the service provider, whether the service handling data that corresponds to the first transaction and is sent by the node device of the service platform is received; executing, by the node device of the service provider, predetermined service handling data acquisition logic if the service handling data is not received; or executing, by the node device of the service provider, service processing logic for the target service object based on the service handling data if the service handling data is received, to generate service processing data of the target service object, where the service processing data includes the identifier of the target service object and at least one piece of attribute data of the target service object; sending, by the node device of the service provider, a second transaction to the blockchain network, where the second transaction is generated based on the service processing data and includes the identifier and the at least one piece of attribute data of the target service object; obtaining, by the node device of the service platform, the second transaction from the block of the blockchain; checking, by the node device of the service platform, whether the service processing data that corresponds to the second transaction and is sent by the node device of the service provider is received; and executing, by the node device of the service platform, predetermined service processing data acquisition logic if the service processing data is not received; or executing, by the node device of the service platform, application logic for the service processing data if the service processing data is received.

According to a second aspect of the one or more embodiments of the present specification, a blockchain-based data processing method is provided, and is applied to a blockchain network system that includes a node device of a service platform and a node device of a service provider, the node device of the service platform is communicatively connected to the node device of the service provider to transmit data, and the method is performed by the node device of the service platform, and includes the following: generating service handling data of a target service object, where the service handling data includes an identifier of the target service object; sending a first transaction to a blockchain, where the first transaction is generated based on the service handling data, and the first transaction includes the identifier of the target service object; obtaining a second transaction from a block of the blockchain, where the second transaction is generated by the node device of the service provider based on service processing data and is sent to the blockchain, the second transaction includes the identifier of the target service object and at least one piece of attribute data of the target service object, the service processing data is generated by the node device of the service provider based on the service handling data, and the service processing data includes the identifier of the target service object and the at least one piece of attribute data of the target service object; checking whether the service processing data that corresponds to the second transaction and is sent by the node device of the service provider is received; and executing predetermined service processing data acquisition logic if the service processing data is not received; or executing application logic for the service processing data if the service processing data is received.

According to a third aspect of the one or more embodiments of the present specification, a blockchain-based data processing method is provided, and is applied to a blockchain network system that includes a node device of a service platform and a node device of a service provider, the node device of the service platform is communicatively connected to the node device of the service provider to transmit data, and the method is performed by the node device of the service provider, and includes the following: obtaining a first transaction from a block of a blockchain, where the first transaction is generated by the node device of the service platform based on service handling data of a target service object and is sent to the blockchain, the first transaction includes an identifier of the target service object, and the service handling data is generated by the node device of the service platform and includes the identifier of the target service object; checking whether the service handling data that corresponds to the first transaction and is sent by the node device of the service platform is received; executing predetermined service handling data acquisition logic if the service handling data is not received; or executing service processing logic for the target service object based on the service handling data if the service handling data is received, to generate service processing data of the target service object, where the service processing data includes the identifier of the target service object and at least one piece of attribute data of the target service object; and sending a second transaction to the blockchain network, where the second transaction is generated based on the service processing data and includes the identifier and the at least one piece of attribute data of the target service object.

According to a fourth aspect of the one or more embodiments of the present specification, a blockchain-based data processing apparatus is provided, and is applied to a blockchain network system that includes a node device of a service platform and a node device of a service provider, the node device of the service platform is communicatively connected to the node device of the service provider to transmit data, and the apparatus is applied to the node device of the service platform, and includes the following: a generation unit, configured to generate service handling data of a target service object, where the service handling data includes an identifier of the target service object; a sending unit, configured to send a first transaction to a blockchain, where the first transaction is generated based on the service handling data, and the first transaction includes the identifier of the target service object; an acquisition unit, configured to obtain a second transaction from a block of the blockchain, where the second transaction is generated by the node device of the service provider based on service processing data and is sent to the blockchain, the second transaction includes the identifier of the target service object and at least one piece of attribute data of the target service object, the service processing data is generated by the node device of the service provider based on the service handling data, and the service processing data includes the identifier of the target service object and the at least one piece of attribute data of the target service object; a check unit, configured to check whether the service processing data that corresponds to the second transaction and is sent by the node device of the service provider is received; and an execution unit, configured to execute application logic for the service processing data or execute predetermined service processing data acquisition logic.

According to a fifth aspect of the one or more embodiments of the present specification, a blockchain-based data processing apparatus is provided, and is applied to a blockchain network system that includes a node device of a service platform and a node device of a service provider, the node device of the service platform is communicatively connected to the node device of the service provider to transmit data, and the apparatus is applied to the node device of the service provider, and includes the following: an acquisition unit, configured to obtain a first transaction from a block of a blockchain, where the first transaction is generated by the node device of the service platform based on service handling data of a target service object and is sent to the blockchain, the first transaction includes an identifier of the target service object, and the service handling data is generated by the node device of the service platform and includes the identifier of the target service object; a check unit, configured to check whether the service handling data that corresponds to the first transaction and is sent by the node device of the service platform is received; an execution unit, configured to execute service processing logic for the target service object based on the service handling data, to generate service processing data of the target service object, where the service processing data includes the identifier of the target service object and at least one piece of attribute data of the target service object; or execute predetermined service handling data acquisition logic; and a sending unit, configured to send a second transaction, where the second transaction is generated based on the service processing data and includes the identifier and the at least one piece of attribute data of the target service object.

According to a sixth aspect of the one or more embodiments of the present specification, a computer device is provided, and includes memory and a processor, where the memory stores a computer program that can be run by the processor, and When running the computer program, the processor performs the data processing method performed by the node device of the service platform.

According to a seventh aspect of the one or more embodiments of the present specification, a computer device is provided, and includes memory and a processor, where the memory stores a computer program that can be run by the processor, and When running the computer program, the processor performs the data processing method performed by the node device of the service provider.

It can be seen from the previous technical solutions that according to the blockchain-based data processing methods and apparatuses provided in the present specification, corresponding blockchain ledgering is performed in a distributed database of the blockchain for service handling and service processing of the target service object based on the service handling performed by the node device of the service platform on the target service object and the service processing performed by the node device of the service provider on the target service object. A tamper-resistant data traceability link is established in the distributed database of the blockchain for the service handling and processing procedures of the target service object based on the tamper-resistant mechanism of the blockchain, so that the service platform and the service provider can perform service data check and completion based on the data traceability link, thereby improving data check efficiency.

BRIEF DESCRIPTION OF DRAWINGS

FIG. 3 illustrates a data structure of a transaction record of an insurance policy/endorsement, according to an example embodiment of the present specification;

FIG. 4(a) illustrates a data structure corresponding to an insurance policy stored in a world state database of a blockchain, according to an example embodiment of the present specification;

FIG. 4(b) illustrates a data structure corresponding to an endorsement stored in a world state database of a blockchain, according to an example embodiment of the present specification;

DESCRIPTION OF EMBODIMENTS

Figure 1:
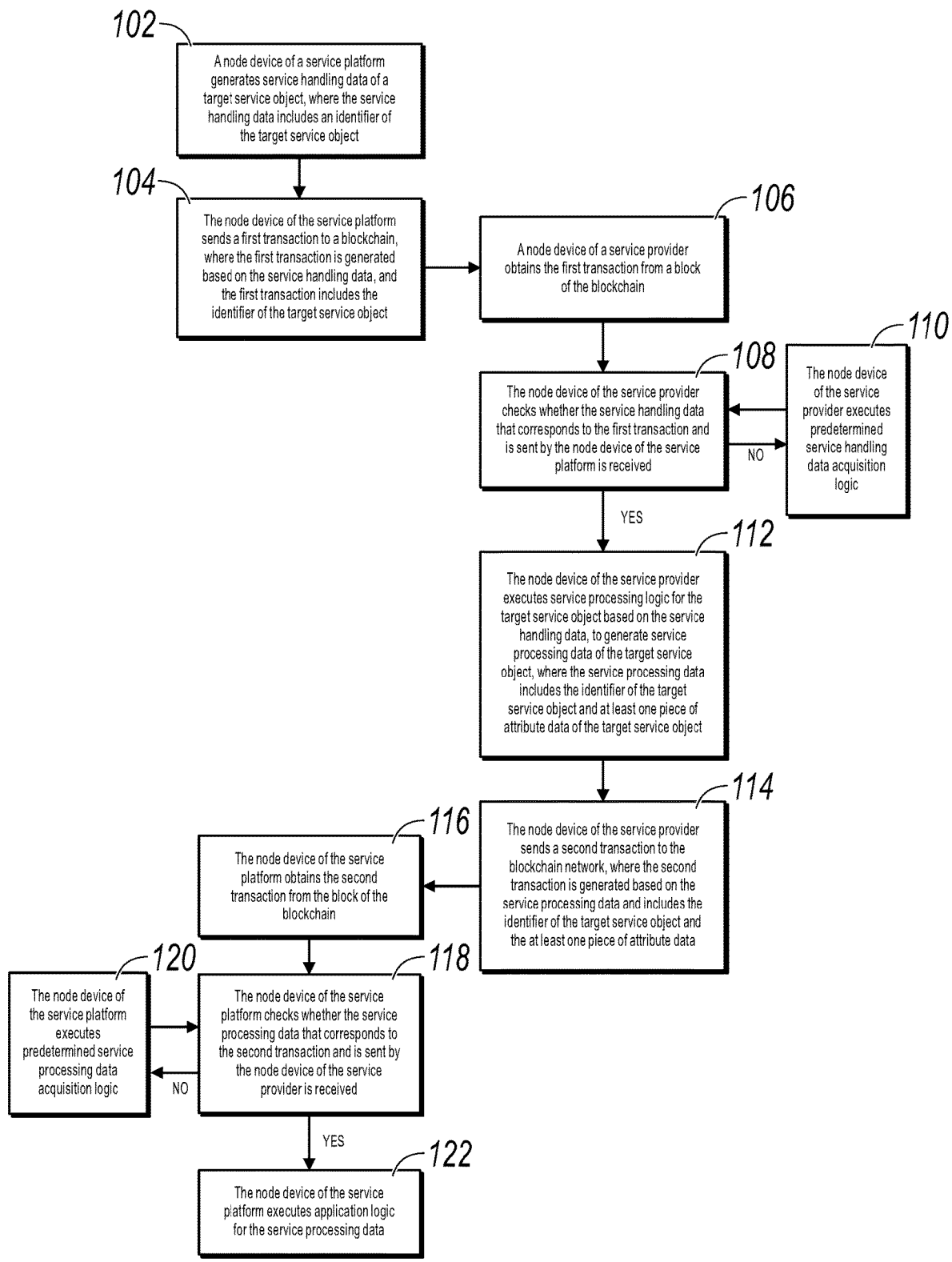
FIG. 1 is a schematic flowchart illustrating a blockchain-based data processing method, according to an embodiment of the present specification.

Embodiments are described in detail here, and examples of the embodiments are presented in the accompanying drawings. When the following description relates to the accompanying drawings, unless specified otherwise, the same numbers in different accompanying drawings represent the same or similar elements. Embodiments described in the following examples do not represent all embodiments consistent with the one or more embodiments of the present specification. On the contrary, the embodiments are only examples of apparatuses and methods that are described in the appended claims in detail and consistent with some aspects of the one or more embodiments of the present specification.

It is worthwhile to note that in other embodiments, steps of a corresponding method are not necessarily performed in a sequence shown and described in the present specification. In some other embodiments, the method can include more or fewer steps than those described in the present specification. In addition, a single step described in the present specification can be divided into a plurality of steps for description in other embodiments, and a plurality of steps described in the present specification can be combined into a single step for description in other embodiments.

As a user-oriented platform, a service platform on the Internet can cooperate with a plurality of service providers, to provide user service handling and service processing result notification services for service processing of the plurality of service providers. During the cooperation between the service platform and the service provider, service data needs to be bidirectionally synchronized. In this case, the biggest problem is unidirectional data flow, and a sender cannot perceive a receiving status of a receiver. Consequently, data inconsistency occurs. Currently, in many data check solutions used by end-user devices of the service platform and the service provider, check (for example, check) is performed based on day end files in databases of the service platform and the service provider. When data missing occurs, there is no location mechanism for quick discovery. In addition, there are insufficient trusted certificates in the data synchronization check process.

In view of this, in an embodiment shown in the present specification, a blockchain-based data processing method is provided, and is applied to a blockchain network system that includes a node device of a service platform and a node device of a service provider. The node device of the service platform is communicatively connected to the node device of the service provider to transmit data.

A blockchain network in the one or more embodiments of the present specification can refer to a P2P network system that is established by node devices by using a consensus mechanism and has a distributed data storage structure. Data in the blockchain is distributed in "blocks" that are adjacent to each other in terms of time, and a current block includes a data digest of a previous block. In addition, full backup of data in all or some of nodes is implemented based on a consensus mechanism (for example, PoW, PoS, DPoS, or PBFT). A person skilled in the art knows that a blockchain network system runs in a corresponding consensus mechanism, and data recorded in a blockchain database is difficult to tamper with by any node. For example, for a blockchain that uses a PoW consensus mechanism, an attack of at least 51% computing power of the entire network is needed to tamper with existing data. Therefore, different from other centralized database systems, the blockchain system has incomparable features of data security, attack prevention, and tamper-resistance. It can be seen that data recorded in the distributed database of the blockchain cannot be attacked or tampered with, thereby ensuring reliability of data information stored in the distributed database of the blockchain.

Example types of the blockchain network can include a public blockchain network, a private blockchain network, and a consortium blockchain network. Although the term blockchain is usually associated with a bitcoin or cryptocurrency network, the blockchain used here can refer to a distributed ledger system (DLS) that does not refer to any particular use case.

In the public blockchain network, a consensus process is controlled by a node in a consensus network. For example, hundreds, thousands, or even millions of entities can cooperate with each other in the public blockchain network, and each entity operates at least one node in the public blockchain network. Therefore, the public blockchain network can be considered as a public network relative to a participant entity. For example, the public blockchain network includes a bitcoin network, and the bitcoin network is a peer-to-peer payment network. The bitcoin network uses a distributed ledger, which is referred to as a blockchain. However, as described above, the term blockchain is used to refer to a distributed ledger that does not refer to the bitcoin network.

The public blockchain network supports public transactions. The public transactions are shared by all nodes in the public blockchain network, and are stored in a global blockchain. The global blockchain is a blockchain that performs replication across all the nodes. That is, for the global blockchain, all the nodes are in a fully consistent state. To reach a consensus (for example, an agreement to add a block to a blockchain), a consensus agreement is implemented in the public blockchain network. For example, the consensus protocol agreement includes but is not limited to proof of work (PoW) implemented in the bitcoin network.

The private blockchain network is usually provided for an entity, and the entity controls read and write permission. The entity controls nodes that can participate in the blockchain network. Therefore, the private blockchain network is usually referred to as a licensed network, and imposes restrictions on a node that is allowed to participate in the network and a participation level (for example, only in certain transactions) of the node. Various types of access control mechanisms (for example, existing participants vote to add new entities, and regulators can control access) can be used.

The consortium blockchain network is usually private in participant entities. In the consortium blockchain network, a consensus process is controlled by a group of authorized nodes (consortium member nodes), and one or more nodes are operated by a corresponding entity (for example, an enterprise). For example, a consortium of ten entities (for example, enterprises) can operate a consortium blockchain network, and each entity operates at least one node in the consortium blockchain network. Therefore, for the participant entity, the consortium blockchain network can be considered as a private network. In some examples, each entity (node) needs to sign each block, so that the block is valid and the valid block is added to a blockchain. In some examples, at least a subset of entities (nodes) (for example, at least seven entities) needs to sign each block, so that the block is valid and the valid block is added to a blockchain.

It can be expected that the embodiments provided in the present specification can be implemented in any suitable type of blockchain network.

A node (or node device) in the one or more embodiments of the present specification can join a blockchain by following a corresponding node protocol and running installation of a node protocol program, and serves as a node in the blockchain. A person skilled in the art usually considers a node device with full backup of data in a distributed database of a blockchain as a full node, and considers a node device with partial backup of the data in the distributed database of the blockchain (for example, only with data of a block header) as a light node. In the one or more embodiments of the present specification, a node type of the node device of the service platform or the node device of the service provider is not limited, and a quantity of node devices of the service platform or node devices of the service provider is not limited either. The service platform or the service provider can correspond to one end-user device or server, or can correspond to a plurality of end-user devices or servers, to serve as a node device in the blockchain.

The service platform in the one or more embodiments of the present specification refers to an entity corresponding to a network service platform, and the service provider is an entity that processes a service handled by the service platform. The service platform can provide a user-oriented service for a service operated by the service provider, and the service can include receiving service handling of a user, providing a service processing result for the user, and so on. Therefore, the service platform can cooperate with end-user devices of one or more service providers, send service handling data to the end-user devices of the one or more service providers, and receive, from the one or more service providers, service processing data obtained after processing by the one or more service providers.

As shown in FIG. 1, the blockchain-based data processing method provided in one embodiment includes the following steps.

Step 102: The node device of the service platform generates service handling data of a target service object, where the service handling data includes an identifier of the target service object.

The node device of the service platform can generate the service handling data of the target service object based on a service processing procedure set by the node device of the service platform and a service application of a user. Content and a form of a service object or the target service object are not limited in the present specification, and can be determined based on a service type operated by the service platform. For example, when the service platform operates an e-commerce service, the service object or the target service object can be a traded product or a service. When the service platform operates a human resources service such as a housekeeping or maintenance service, the service object or the target service object can be an individual that provides the human resources service. When the service platform operates an asset hosting service, the service object or the target service object can be an asset hosted by a user. When the service platform operates an insurance service, the service object or the target service object can be an insurance policy of a user.

Correspondingly, the node device of the service platform can independently generate the identifier of the target service object based on a property of the target service object, or select an attribute of the target service object as the identifier of the target service object. For example, in the previously enumerated examples, the identifier of the target service object in the service handling data can include a number of an e-commerce order, an identity number of a service person, an attribute code of a hosted asset, a number of an insurance policy. Embodiments are not limited here.

Step 104: The node device of the service platform sends a first transaction to a blockchain, where the first transaction is generated based on the service handling data, and the first transaction includes the identifier of the target service object.

The transaction in the one or more embodiments of the present specification refers to a piece of data that is created by a node device in the blockchain and can be finally published in a block of the blockchain. A transaction in the blockchain is a transaction in a narrow sense or a transaction in a broad sense. A transaction in a narrow sense refers to a value transfer published by a user in the blockchain. For example, in a conventional bitcoin blockchain network, a transaction can be a transfer initiated by a user in the blockchain. A transaction in a broad sense refers to service data that is published by a user entity in the blockchain by using a node and is with a service intention. The first transaction in some embodiments is a piece of data that is generated based on the service handling data and includes the identifier of the target service object. In a one embodiment, the first transaction can include all content of the service handling data. In another embodiment, the first transaction can include a hash digest of the service handling data and the identifier of the target service object. Ledgering can be performed for the service handling data and the identifier of the target service object based on a tamper-resistant mechanism of the blockchain.

A detailed process of recording the first transaction in some embodiments in the block of the blockchain can be set based on a verification mechanism and a consensus mechanism of the blockchain. In one embodiment, uploading the first transaction to a distributed database of the blockchain includes: adding the first transaction to a candidate block after verification performed by nodes with bookkeeping permission in the blockchain on the first transaction succeeds; determining, from the nodes with bookkeeping permission, a consensus bookkeeping node that satisfies the consensus mechanism of the blockchain; broadcasting, by the consensus bookkeeping node, the candidate block to nodes in the blockchain; and after verification performed by a predetermined quantity of nodes in the blockchain on the candidate block succeeds, considering the candidate block as the latest block, and adding the candidate block to the distributed database of the blockchain.

In some embodiments, the node with bookkeeping permission is a node with permission to generate a candidate block. Based on the consensus mechanism of the blockchain, the consensus bookkeeping node can be determined from the nodes with bookkeeping permission for the candidate block. The consensus mechanism can include a proof of work (PoW) mechanism, a proof of stake (PoS) mechanism, a delegated proof of stake (DPoS) mechanism, a practical Byzantine fault tolerance (PBFT) algorithm mechanism commonly used in a consortium blockchain, etc.

In an actual service application, the blockchain network in the one or more embodiments of the present specification can be constructed as a consortium blockchain, and the node device of the service platform serves as a node device of a consortium member, and sends the first transaction to the consortium blockchain. Compared with a public blockchain, the consortium blockchain usually uses a highly efficient consensus algorithm that can satisfy demands of a large transaction volume, for example, the first transaction frequently generated based on a large quantity of service handling demands. In addition, a consensus delay is very low, a demand of real-time processing can be basically satisfied, and the first transaction can be quickly recorded in a newly generated block of the blockchain in real time. Furthermore, a trusted node (for example, a node corresponding to the service platform or the service provider) in the consortium blockchain network is used as a preselected bookkeeping node, so that both security and stability can be considered. In addition, the consensus algorithm (for example, PBFT) of the consortium blockchain usually consumes few computer power resources, and does not necessarily require currency circulation, and therefore has higher usability.

Step 106: The node device of the service provider obtains the first transaction from the block of the blockchain.

The node device of the service provider can set an event monitoring mechanism for the first transaction. When synchronizing to the block that stores the first transaction, the node device of the service provider obtains an event notification indicating that the first transaction is recorded in the block of the blockchain, and then obtains the first transaction from the locally synchronized block of the blockchain. Certainly, the node device of the service provider can alternatively query block data of the blockchain based on the identifier of the target service object, to obtain the first transaction.

Step 108: The node device of the service provider checks whether the service handling data that corresponds to the first transaction and is sent by the node device of the service platform is received.

In some embodiments, the node device of the service platform is communicatively connected to the node device of the service provider. The node device of the service platform can directly send the service handling data to the node device of the service provider, so that the node device of the service provider receives the service handling data. However, due to network system congestion, a fault, etc., the node device of the service provider may not receive, when obtaining the first transaction, the service handling data sent by the service platform.

Step 110: The node device of the service provider executes predetermined service handling data acquisition logic if the service handling data is not received.

The present embodiment is not limited to an implementation of the predetermined service handling data acquisition logic. The node device of the service provider can send an application for obtaining the service handling data to the node device of the service platform, to prompt the node device of the service platform to send or send the service handling data again. In another embodiment, when the first transaction includes all the content of the service handling data, the node device of the service provider can generate the content of the service handling data based on the first transaction obtained from the block synchronized in the blockchain network.

Step 112: The node device of the service provider executes service processing logic for the target service object based on the service handling data if the service handling data is received, to generate service processing data of the target service object, where the service processing data includes the identifier of the target service object and at least one piece of attribute data of the target service object.

The node device of the service provider performs service processing on the target service object based on a service processing logic rule set by the node device of the service provider, and generates service processing data of the target service object. The at least one piece of attribute data can be used to describe a processing result of the target service object. For example, in the previously enumerated service object instances, the attribute data of the service object can be "delivered", "received", "hosted", or "endorsed". In another shown embodiment, the at least one piece of attribute data can be a hash digest of the service processing data of the target service object.

Step 114: The node device of the service provider sends a second transaction to the blockchain network, where the second transaction is generated based on the service processing data and includes the identifier of the target service object and the at least one piece of attribute data.

Similar to the first transaction, the second transaction in some embodiments is a piece of data that is generated based on the service processing data and includes the identifier of the target service object and the at least one piece of attribute data of the target service object. In one embodiment, the second transaction can include all content of the service processing data. In another embodiment, the second transaction can include a hash digest of the service processing data, the identifier, and the at least one piece of attribute data of the target service object. Ledgering can be performed for the service processing data, the identifier, and the at least one piece of attribute data of the target service object based on the tamper-resistant mechanism of the blockchain.

A detailed process of recording the second transaction in the block of the blockchain can be similar to the implementation process of recording the first transaction. Details are omitted here for simplicity.

Step 116: The node device of the service platform obtains the second transaction from the block of the blockchain.

Similarly, the node device of the service platform can set an event monitoring mechanism for the second transaction. When synchronizing to the block that stores the second transaction, the node device of the service platform obtains an event notification indicating that the second transaction is recorded in the block of the blockchain, and then obtains the second transaction from the locally synchronized block of the blockchain. Certainly, the node device of the service platform can alternatively query the block data of the blockchain based on the identifier of the target service object, to obtain the second transaction.

Step 118: The node device of the service platform checks whether the service processing data that corresponds to the second transaction and is sent by the node device of the service provider is received.

In some embodiments, the node device of the service platform is communicatively connected to the node device of the service provider. The node device of the service provider can directly send the service processing data to the node device of the service platform, so that the node device of the service platform receives the service processing data. However, due to network system congestion, a fault, etc., the node device of the service platform may not receive, when obtaining the second transaction, the service processing data sent by the service provider.

Step 120: The node device of the service platform executes predetermined service processing data acquisition logic if the service processing data is not received.

Similarly, the present embodiment is not limited to an implementation of the predetermined service processing data acquisition logic. The node device of the service platform can send an application for obtaining the service processing data to the node device of the service provider, to prompt the node device of the service provider to send or send the service processing data again. In another embodiment, when the second transaction includes all the content of the service processing data, the node device of the service platform can generate the content of the service processing data based on the second transaction obtained from the block synchronized in the blockchain network.

Step 122: The node device of the service platform executes application logic for the service processing data if the service processing data is received.

The present embodiment is not limited to execution content and an implementation of the application logic for the service processing data. The node device of the service platform can execute, based on a service application scenario of the service platform, an application that includes a service processing result of the service processing data, for example, push the service processing result to a platform user, or execute a service action of a next procedure.

Based on the blockchain-based data processing method provided in the one or more embodiments, corresponding blockchain ledgering is performed in the distributed database (block) of the blockchain for the service handling data and the service processing data of the target service object. Based on the tamper-resistant mechanism of the blockchain, a complete and tamper-resistant data traceability link is established in a block ledger of the blockchain based on the identifier of the target service object for the service handling and processing procedures of the target service object, so that the service platform and the service provider can perform service data check and data completion based on the data traceability link, thereby improving data check efficiency.

To further facilitate data check between the service platform and the service provider, when the node device of the service platform is communicatively connected to the node device of the service provider to transmit the service handling data and the service processing data, in another shown embodiment, each of the node device of the service platform and the node device of the service provider generates a transaction record of the target service object based on the first transaction and the second transaction obtained from the block. The transaction record includes the identifier of the target service object and transaction identifiers of the first transaction and the second transaction. The transaction identifier of the first transaction can include a hash value of the service handing data, a hash value (TxID) of the first transaction, etc. The transaction identifier of the second transaction can include a hash value of the service processing data, a hash value (TxID) of the second transaction, etc.

Correspondingly, that the node device of the service provider checks whether the service handling data that corresponds to the first transaction and is sent by the node device of the service platform is received in the previous embodiment includes: the node device of the service provider checks, based on the transaction identifier of the first transaction that is included in the transaction record, whether the service handling data sent by the node device of the service platform is received. That the node device of the service platform checks whether the service processing data that corresponds to the second transaction and is sent by the node device of the service provider is received in the previous embodiment includes: the node device of the service platform checks, based on the transaction identifier of the second transaction that is included in the transaction record, whether the service processing data sent by the node device of the service provider is received.

The node device of the service platform and the node device of the service provider can check, based on the transaction record generated based on blockchain data, service data received by the node device of the service platform and the node device of the service provider. When the service data received by the node device of the service platform and the node device of the service provider is consistent with the transaction record in the blockchain, it can be ensured that service data records transmitted by the node device of the service platform and the node device of the service provider are consistent, and no service data is missing or dropped. In addition, service data check is performed based on the transaction record, and day end check can be performed at any time without waiting, thereby improving service data check efficiency. In an existing check system, it is costly to develop joint commissioning, and the joint commissioning needs to be performed with cooperation between the two parties. For data check performed based on a blockchain, it is unnecessary to further develop and deploy check joint commissioning for the two parties, thereby reducing service data check costs. In addition, data check performed based on blockchain data benefits from an attribute that the blockchain data is difficult to tamper with, thereby improving trustworthiness of service data check.

After the efficient and trustworthy data check, the two parties can send a data acquisition application by communicating with each other again, to add, in a timely way, service data missing or dropped in data transmission between the two parties, or the two parties can add, based on the first transaction or the second transaction in the blockchain, service data missing or dropped in data transmission between the two parties, thereby further improving service processing efficiency of systems of the two parties. A person skilled in the art should know that costs of joint commissioning for the two parties are saved by performing service data completion based on the first transaction or the second transaction stored in the block of the blockchain, and trustworthiness of added service data is improved based on the tamper-resistant mechanism of the blockchain.

It is worthwhile to note that in addition to the block "ledger" of the blockchain, the distributed database of the blockchain includes a "world state" database that is generated based on a transaction in the block "ledger" and is distributed in a node device in the blockchain. A method of generating a world state of a corresponding data object based on a transaction in a block is usually performed by invoking a smart contract by using the transaction in the block. Details are omitted here for simplicity.

Therefore, in another shown embodiment of the present specification, the first transaction is used by the node device in the blockchain to establish a data set corresponding to the target service object in the world state database of the blockchain based on the first transaction after being recorded in the block of the blockchain, and the data set includes the identifier of the target service object; and the second transaction is used by the node device in the blockchain to update the data set corresponding to the target service object in the world state database of the blockchain based on the second transaction after being recorded in the block of the blockchain, and an updated data set includes the identifier and the at least one piece of attribute data of the target service object.

Therefore, in some embodiments, in addition to the second transaction, the node device of the service platform can generate the service processing data based on the data set that corresponds to the target service object and that is stored in the world state database of the blockchain after the second transaction is recorded in the block. In addition to the first transaction, the node device of the service provider can generate the service handling data based on the data set that corresponds to the target service object and that is stored in the world state database of the blockchain after the first transaction is recorded in the block.

The node device of the service platform or the node device of the service provider can directly query the identifier of the target service object or the attribute data of the target service object from a local database, to directly obtain the corresponding service handling data or service processing data.

The technical solutions of the present application are described in detail below by using an application scenario, in the financial insurance field, in which an insurance platform and an insurance company or institution cooperate to perform user insurance cover or insurance policy endorsement as an example.

The insurance platform serves as the service platform, and the insurance institution serves as the service provider. The insurance platform can provide user-oriented insurance cover or insurance policy endorsement services for insurance products of at least one insurance institution. An insurance policy or an insurance endorsement is used as the target service object. Correspondingly, the identifier of the target service object is a number of the insurance policy or a number of the insurance endorsement, the service handling data is handling data of the insurance policy or handling data of the insurance endorsement, and the service processing data is underwriting result data of the insurance policy or endorsement result data of the insurance endorsement.

Figure 2:
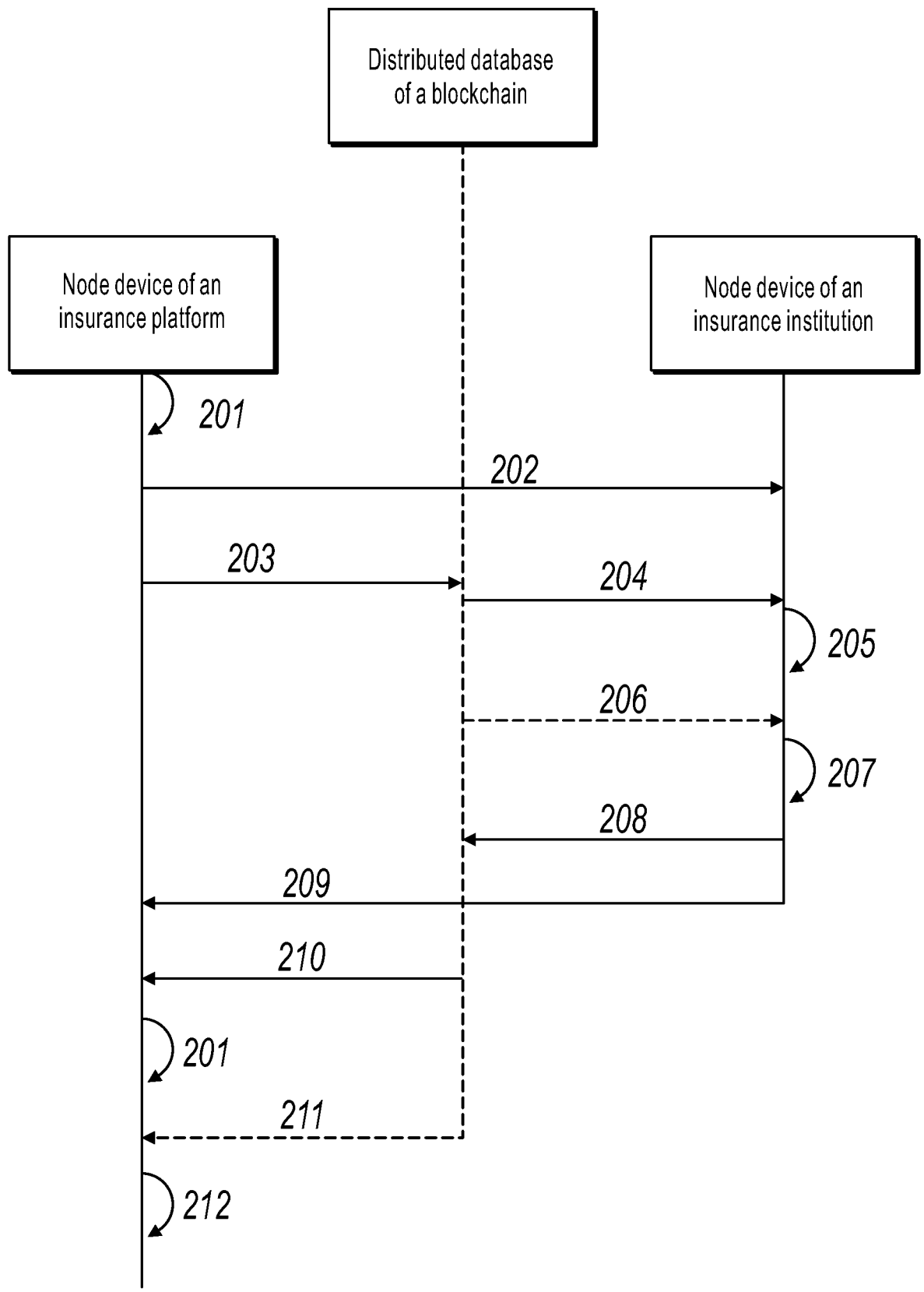
FIG. 2 is a schematic flowchart illustrating applying a blockchain-based data processing method to an insurance cover or endorsement service scenario, according to an embodiment of the present specification.

To complete the service, an end-user device of the insurance platform and an end-user device of the insurance institution need to transmit service data. As shown in FIG. 2, the end-user device of the insurance platform and the end-user device of the insurance institution serve as node devices in a blockchain, and a procedure of a blockchain-based data processing method cooperatively performed by the end-user device of the insurance platform and the end-user device of the insurance institution includes the following steps.

Step 201: The node device of the insurance platform generates handling data of an insurance policy/endorsement based on an insurance cover or insurance policy endorsement request of a user.

Step 202: The node device of the insurance platform sends the handling data of the insurance policy/endorsement to the node device of the insurance institution.

Step 203: The node device of the insurance platform sends a first transaction to the blockchain, where the first transaction is generated based on the handling data of the insurance policy/endorsement, and the first transaction includes a number of the insurance policy/endorsement, to use the number of the insurance policy/endorsement as an identifier of the insurance policy/endorsement.

Step 204: The node device of the insurance institution obtains the first transaction from a block of the blockchain, where a data set corresponding to the insurance policy/endorsement is established in a world state database of the blockchain by using the first transaction, and the data set can use a data set structure shown in, for example, FIG. 4(a) or FIG. 4(b).

Step 205: The node device of the insurance institution checks whether the handling data of the insurance policy/endorsement that corresponds to the first transaction and is sent by the insurance platform is received.

Step 206: The node device of the insurance institution generates the corresponding handling data of the insurance policy/endorsement based on the data set that is of the structure shown in FIG. 4(a) or FIG. 4(b) and is stored in the local world state database if the handling data of the insurance policy/endorsement is not received.

Step 207: The node device of the insurance institution executes approval service processing logic for the policy/endorsement based on the handling data of the insurance policy/endorsement if the handling data of the insurance policy/endorsement is received, to generate underwriting result data of the insurance policy or endorsement result data of the insurance endorsement. The underwriting result data of the insurance policy or the endorsement result data of the insurance endorsement includes the number of the insurance policy/endorsement and an underwriting result of the insurance policy/an endorsement result of the endorsement, to use the number of the insurance policy/endorsement and the underwriting result of the insurance policy/the endorsement result of the endorsement as at least one piece of attribute data of the insurance policy/endorsement. The underwriting result of the insurance policy can include "underwritten", "failed to be underwritten", etc., and the endorsement result of the endorsement can include "endorsed", "unendorsed", etc.

Step 208: The node device of the insurance institution sends a second transaction to the blockchain network, where the second transaction is generated based on the underwriting result data of the insurance policy or the endorsement result data of the insurance endorsement, and includes the number of the insurance policy/endorsement and the underwriting result of the insurance policy/the endorsement result of the endorsement.

Step 209: The node device of the insurance institution sends the underwriting result data of the insurance policy/the endorsement result data of the insurance endorsement to the node device of the insurance platform, so that the node device of the insurance platform obtains the underwriting result data of the insurance policy/the endorsement result data of the insurance endorsement.

Step 210: The node device of the insurance platform obtains the second transaction from the block of the blockchain, where the data set corresponding to the insurance policy/endorsement is updated in the world state database of the blockchain by using the second transaction.

Step 211: The node device of the insurance platform generates a transaction record of the insurance policy/endorsement based on the first transaction and the second transaction, where the transaction record includes the number of the insurance policy/endorsement, and transaction identifiers TxID of the first transaction and the second transaction. FIG. 3 illustrates a transaction record of an insurance policy/endorsement, according to an embodiment of the present specification.

Step 212: The node device of the insurance platform checks, based on the transaction record, whether the underwriting result data of the insurance policy/the endorsement result data of the insurance endorsement sent by the node device of the insurance institution is received.

Step 213: The insurance platform pushes an underwriting result/endorsement result notification to the user in the insurance platform based on the underwriting result data of the insurance policy/the endorsement result data of the insurance endorsement if the underwriting result data of the insurance policy/the endorsement result data of the insurance endorsement is received.

Step 214: The node device of the insurance platform generates the corresponding underwriting result data of the insurance policy/endorsement result data of the insurance endorsement based on the data set that is stored in the local world state database, corresponds to the insurance policy/endorsement, and is updated based on the second transaction.

As described above, the blockchain network system can set a corresponding world state data set for the insurance policy/endorsement based on the first transaction and the second transaction. FIG. 4(a) and FIG. 4(b) respectively illustrate data set structures corresponding to the insurance policy and the endorsement stored in the world state database of the blockchain. The node device of the insurance institution and the node device of the insurance platform can add the handling data of the insurance policy/endorsement and the underwriting result data of the insurance policy/endorsement result data of the insurance endorsement based on state data of the insurance/endorsement that is stored in the local database of the device and is shown in FIG. 4(a) or FIG. 4(b). In comparison with a method for obtaining a state or corresponding service data of the insurance policy/endorsement by using a blockchain transaction, the state or the corresponding service data of the insurance policy/endorsement can be more conveniently and quickly obtained by establishing the state data of the insurance policy/endorsement in the world state database of the blockchain.

Corresponding to the procedure implementation, embodiments of the present specification further provide blockchain-based data processing apparatuses 50 and 60. The apparatuses 50 and 60 can be implemented by software, hardware, or a combination of hardware and software. Software implementation is used as an example. As a logical apparatus, the apparatus is formed after a central process unit (CPU) of a device in which the apparatus is located reads a corresponding computer program instruction to a memory for running. In terms of hardware implementation, in addition to the CPU, the memory, and the storage shown in FIG. 7, the device in which the apparatus is located usually includes other hardware such as a chip for sending and receiving radio signals and/or other hardware such as a card configured to implement a network communication function.

Figure 5:
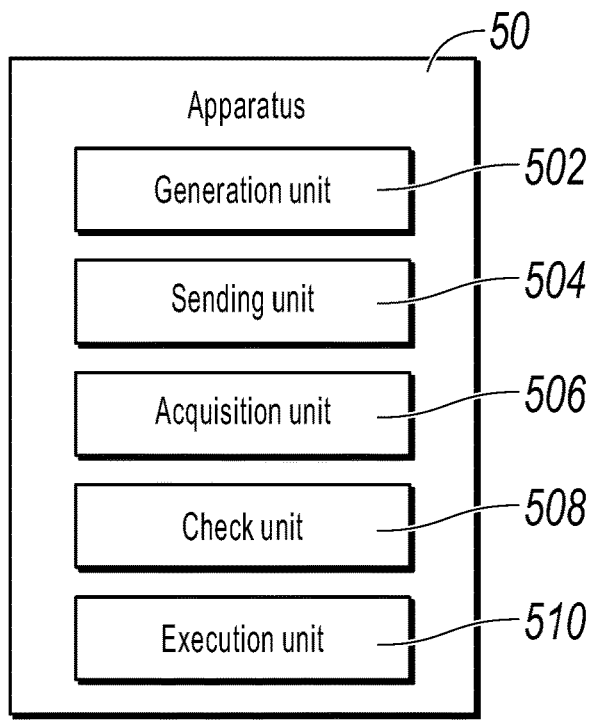
FIG. 5 is a schematic diagram illustrating a blockchain-based data processing apparatus applied to a node device of a service platform, according to an embodiment of the present specification.

As shown in FIG. 5, the present specification further provides a blockchain-based data processing apparatus 50. The apparatus 50 is applied to a blockchain network system that includes a node device of a service platform and a node device of a service provider. The node device of the service platform is communicatively connected to the node device of the service provider to transmit data. The apparatus is applied to the node device of the service platform, and includes the following: a generation unit 502, configured to generate service handling data of a target service object, where the service handling data includes an identifier of the target service object; a sending unit 504, configured to send a first transaction to a blockchain, where the first transaction is generated based on the service handling data, and the first transaction includes the identifier of the target service object; an acquisition unit 506, configured to obtain a second transaction from a block of the blockchain, where the second transaction is generated by the node device of the service provider based on service processing data and is sent to the blockchain, the second transaction includes the identifier of the target service object and at least one piece of attribute data of the target service object, the service processing data is generated by the node device of the service provider based on the service handling data, and the service processing data includes the identifier of the target service object and the at least one piece of attribute data of the target service object; a check unit 508, configured to check whether the service processing data that corresponds to the second transaction and is sent by the node device of the service provider is received; and an execution unit 510, configured to execute application logic for the service processing data or execute predetermined service processing data acquisition logic.

In a shown embodiment, the execution unit 510 is further configured to: send an application for obtaining the service processing data to the node device of the service provider.

In a shown embodiment, the execution unit 510 is further configured to: generate the service processing data based on the second transaction.

In a shown embodiment, the node device of the service platform generates a transaction record of the target service object based on the first transaction and the second transaction, and the transaction record includes the identifier of the target service object and transaction identifiers of the first transaction and the second transaction; and the check unit 508 is further configured to: check, based on the transaction record, whether the service processing data sent by the node device of the service provider is received.

In a shown embodiment, the first transaction is used by a node device in the blockchain to establish a data set corresponding to the target service object in a world state database of the blockchain based on the first transaction after being recorded in the block of the blockchain, and the data set includes the identifier of the target service object; and the second transaction is used by the node device in the blockchain to update the data set corresponding to the target service object in the world state database of the blockchain based on the second transaction after being recorded in the block of the blockchain, and an updated data set includes the identifier and the at least one piece of attribute data of the target service object.

In a shown embodiment, the execution unit 510 is further configured to: generate the service processing data based on the data set corresponding to the target service object.

For an implementation process of functions of units in the apparatus 50, references can be made to an implementation process of corresponding steps in the blockchain-based data processing method performed by the node device of the service platform. For related parts, references can be made to partial description in the method embodiment. Details are omitted here for simplicity.

Figure 6:
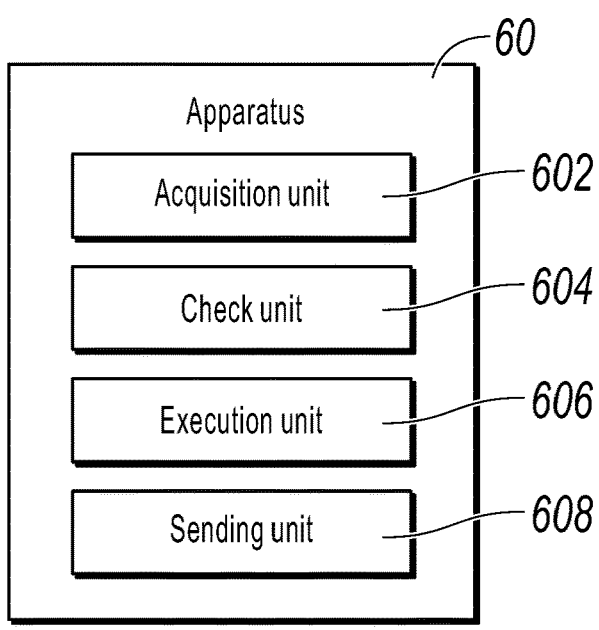
FIG. 6 is a schematic diagram illustrating a blockchain-based data processing apparatus applied to a node device of a service provider, according to an embodiment of the present specification.

As shown in FIG. 6, the present specification further provides a blockchain-based data processing apparatus 60. The apparatus 60 is applied to a blockchain network system that includes a node device of a service platform and a node device of a service provider. The node device of the service platform is communicatively connected to the node device of the service provider to transmit data. The apparatus 60 is applied to the node device of the service provider, and includes the following: an acquisition unit 602, configured to obtain a first transaction from a block of a blockchain, where the first transaction is generated by the node device of the service platform based on service handling data of a target service object and is sent to the blockchain, the first transaction includes an identifier of the target service object, and the service handling data is generated by the node device of the service platform and includes the identifier of the target service object; a check unit 604, configured to check whether the service handling data that corresponds to the first transaction and is sent by the node device of the service platform is received; an execution unit 606, configured to execute service processing logic for the target service object based on the service handling data, to generate service processing data of the target service object, where the service processing data includes the identifier of the target service object and at least one piece of attribute data of the target service object; or execute predetermined service handling data acquisition logic; and a sending unit 608, configured to send a second transaction, where the second transaction is generated based on the service processing data and includes the identifier and the at least one piece of attribute data of the target service object.

In a shown embodiment, the execution unit 606 is further configured to: send an application for obtaining the service handling data to the node device of the service platform.

In a shown embodiment, the execution unit 606 is further configured to: generate the service handling data based on the first transaction.

In a shown embodiment, each of the node device of the service platform and the node device of the service provider generates a transaction record of the target service object based on the first transaction and the second transaction, and the transaction record includes the identifier of the target service object and transaction identifiers of the first transaction and the second transaction; and the check unit 604 is further configured to: check, based on the transaction record, whether the service handling data sent by the node device of the service platform is received.

In a shown embodiment, the first transaction is used by a node device in the blockchain to establish a data set corresponding to the target service object in a world state database of the blockchain based on the first transaction after being recorded in the block of the blockchain, and the data set includes the identifier of the target service object; and the second transaction is used by the node device in the blockchain to update the data set corresponding to the target service object in the world state database of the blockchain based on the second transaction after being recorded in the block of the blockchain, and an updated data set includes the identifier and the at least one piece of attribute data of the target service object.

In a shown embodiment, the execution unit 606 is further configured to: generate the service handling data based on the data set corresponding to the target service object.

For an implementation process of functions of units in the apparatus 60, references can be made to an implementation process of corresponding steps in the blockchain-based data processing method performed by the node device of the service provider. For related parts, references can be made to partial description in the method embodiment. Details are omitted here for simplicity.

The previously described apparatus embodiment is merely an example. The units described as separate parts may or may not be physically separate, and parts displayed as units may or may not be physical modules, may be located in one position, or may be distributed on a plurality of network modules. Some or all of the units can be selected based on actual demands to achieve the objective of the solutions of the present specification. A person of ordinary skill in the art can understand and implement the solutions of the present specification without creative efforts.

The apparatuses, units, and modules illustrated in the previous embodiments can be implemented by using a computer chip or an entity, or can be implemented by using a product that has a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Figure 7:
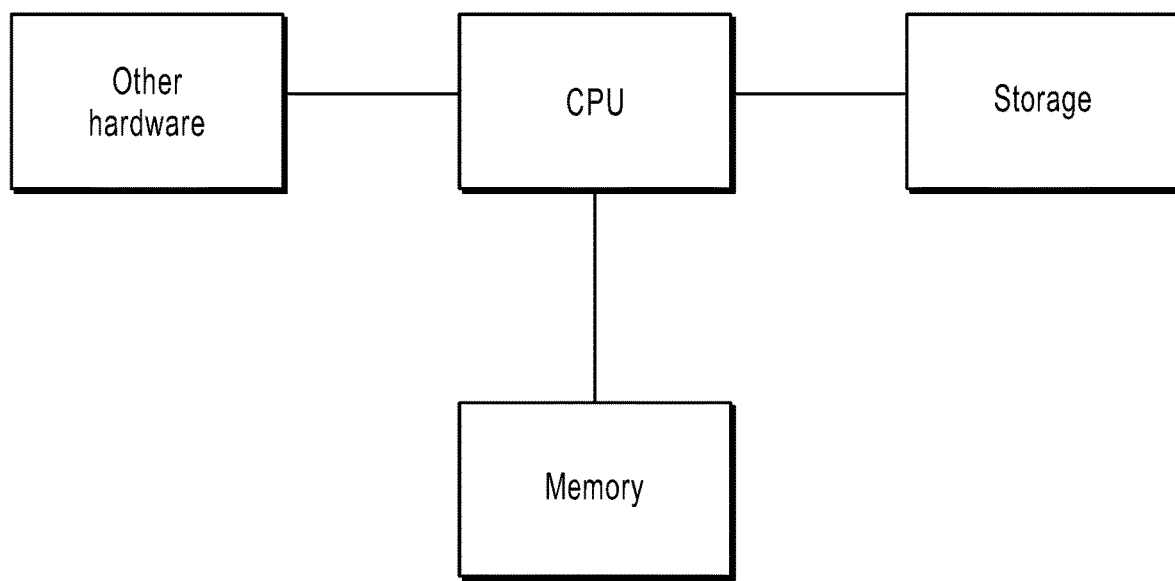
FIG. 7 is a structural diagram of hardware that executes an embodiment of a blockchain-based data processing apparatus provided in the present specification.

Corresponding to the method embodiment, an embodiment of the present specification further provides a computer device. As shown in FIG. 7, the computer device includes a memory and a processor. The memory stores a computer program that can be run by the processor. When running the stored computer program, the processor performs the steps of the blockchain-based data processing method performed by the node device of the service platform in the embodiments of the present specification. For detailed description of the steps of the blockchain-based data processing method performed by the node device of the service platform, references can be made to the previous content. Details are omitted for simplicity.

Corresponding to the method embodiment, an embodiment of the present specification further provides a computer device. As shown in FIG. 7, the computer device includes a memory and a processor. The memory stores a computer program that can be run by the processor. When running the stored computer program, the processor performs the steps of the blockchain-based data processing method performed by the node device of the service provider in the embodiments of the present specification. For detailed description of the steps of the blockchain-based data processing method performed by the node device of the service provider, references can be made to the previous content. Details are omitted for simplicity.

The previous descriptions are merely preferred embodiments of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data.

Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that the terms "include", "comprise", and their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . ." does not preclude the existence of additional identical elements in the process, method, product, or device that includes the element.

A person skilled in the art should understand that an embodiment of the present specification can be provided as a method, a system, or a computer program product. Therefore, the embodiments of the present application can use a form of hardware only embodiments, software only embodiments, or embodiments with a combination of software and hardware. In addition, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method comprising:
   generating, by a blockchain node device of a service platform, service handling data of a target service object, wherein the service handling data comprises an identifier of the target service object;
   sending, by the blockchain node device of the service platform, first transaction data, as part of a first transaction, to a blockchain, wherein the first transaction data is generated based on the service handling data, and the first transaction data comprises the identifier of the target service object;
   obtaining, by the blockchain node device of the service platform, second transaction data, as part of a second transaction, from a block of the blockchain, wherein the second transaction data is generated by a blockchain node device of a service provider, the second transaction data comprising service processing data, wherein the service processing data, in turn, is generated by the blockchain node device of the service provider based on the service handling data, and wherein the service processing data comprises the identifier of the target service object and at least one piece of attribute data of the target service object;
   generating a transaction record of the target service object based on the first transaction and the second transaction, wherein the transaction record comprises the identifier of the target service object and transaction identifiers of the first transaction and the second transaction;
   checking, based on the transaction record, whether the blockchain node device of the service platform receives the service processing data that corresponds to the second transaction and is sent by the blockchain node device of the service provider; and
   executing predetermined service processing data acquisition logic if the blockchain node device of the service platform does not receive the service processing data, or
   executing application logic for the service processing data if the blockchain node device of the service platform receives the service processing data,
   wherein the blockchain node device of the service platform and the blockchain node device of the service provider are part of a blockchain network system.

2. The computer-implemented method of claim 1, wherein executing predetermined service processing data acquisition logic comprises:
   sending an application for obtaining the service processing data to the blockchain node device of the service provider.

3. The computer-implemented method of claim 1, wherein executing predetermined service processing data acquisition logic comprises:
   generating the service processing data based on the second transaction.

4. The computer-implemented method of claim 1, wherein a third node device in the blockchain uses the first transaction data to establish a data set corresponding to the target service object in a world state database of the blockchain based on the first transaction after being recorded in a first block of the blockchain, and the data set comprises the identifier of the target service object, and
   the third node device in the blockchain uses the second transaction to update the data set corresponding to the target service object in the world state database of the blockchain based on the second transaction after being recorded in a second block of the blockchain, and an updated data set comprises the identifier and the at least one piece of attribute data of the target service object.

5. The computer-implemented method of claim 4, wherein executing predetermined service processing data acquisition logic comprises generating the service processing data based on the data set corresponding to the target service object.

6. The computer-implemented method of claim 1, wherein the blockchain is a consortium blockchain, and the blockchain node device of the service platform and the blockchain node device of the service provider are node devices of consortium members in the consortium blockchain.

7. A non-transitory, computer-readable medium storing one or more instructions executable by a computer system to perform operations comprising:
   generating, by a blockchain node device of a service platform, service handling data of a target service object, wherein the service handling data comprises an identifier of the target service object;
   sending, by the blockchain node device of the service platform, first transaction data, as part of a first transaction, to a blockchain, wherein the first transaction data is generated based on the service handling data, and the first transaction data comprises the identifier of the target service object;
   obtaining, by the blockchain node device of the service platform, second transaction data, as part of a second transaction, from a block of the blockchain, wherein the second transaction data is generated by a blockchain node device of a service provider, the second transaction data comprising service processing data, wherein the service processing data, in turn, is generated by the blockchain node device of the service provider based on the service handling data, and wherein the service processing data comprises the identifier of the target service object and at least one piece of attribute data of the target service object;
   generating a transaction record of the target service object based on the first transaction and the second transaction, wherein the transaction record comprises the identifier of the target service object and transaction identifiers of the first transaction and the second transaction;

checking, based on the transaction record, whether the blockchain node device of the service platform receives the service processing data that corresponds to the second transaction and is sent by the blockchain node device of the service provider; and executing predetermined service processing data acquisition logic if the blockchain node device of the service platform does not receive the service processing data, or executing application logic for the service processing data if the blockchain node device of the service platform receives the service processing data, wherein the blockchain node device of the service platform and the blockchain node device of the service provider are part of a blockchain network system.

8. The non-transitory, computer-readable medium of claim 7, wherein executing predetermined service processing data acquisition logic comprises:

sending an application for obtaining the service processing data to the blockchain node device of the service provider.

9. The non-transitory, computer-readable medium of claim 7, wherein executing predetermined service processing data acquisition logic comprises:

generating the service processing data based on the second transaction.

10. The non-transitory, computer-readable medium of claim 7, wherein a third node device in the blockchain uses the first transaction data to establish a data set corresponding to the target service object in a world state database of the blockchain based on the first transaction after being recorded in a first block of the blockchain, and the data set comprises the identifier of the target service object, and the third node device in the blockchain uses the second transaction to update the data set corresponding to the target service object in the world state database of the blockchain based on the second transaction after being recorded in a second block of the blockchain, and an updated data set comprises the identifier and the at least one piece of attribute data of the target service object.

11. The non-transitory, computer-readable medium of claim 10, wherein executing predetermined service processing data acquisition logic comprises generating the service processing data based on the data set corresponding to the target service object.

12. The non-transitory, computer-readable medium of claim 7, wherein the blockchain is a consortium blockchain, and the blockchain node device of the service platform and the blockchain node device of the service provider are node devices of consortium members in the consortium blockchain.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

generating, by a blockchain node device of a service platform, service handling data of a target service object, wherein the service handling data comprises an identifier of the target service object;

sending, by the blockchain node device of the service platform, first transaction data, as part of a first transaction, to a blockchain, wherein the first transaction data is generated based on the service handling data, and the first transaction data comprises the identifier of the target service object;

obtaining, by the blockchain node device of the service platform, second transaction data, as part of a second transaction, from a block of the blockchain, wherein the second transaction data is generated by a blockchain node device of a service provider, the second transaction data comprising service processing data, wherein the service processing data, in turn, is generated by the blockchain node device of the service provider based on the service handling data, and wherein the service processing data comprises the identifier of the target service object and at least one piece of attribute data of the target service object;

generating a transaction record of the target service object based on the first transaction and the second transaction, wherein the transaction record comprises the identifier of the target service object and transaction identifiers of the first transaction and the second transaction;

checking, based on the transaction record, whether the blockchain node device of the service platform receives the service processing data that corresponds to the second transaction and is sent by the blockchain node device of the service provider; and executing predetermined service processing data acquisition logic if the blockchain node device of the service platform does not receive the service processing data, or executing application logic for the service processing data if the blockchain node device of the service platform receives the service processing data, wherein the blockchain node device of the service platform and the blockchain node device of the service provider are part of a blockchain network system.

14. The computer-implemented system of claim 13, wherein executing predetermined service processing data acquisition logic comprises:

sending an application for obtaining the service processing data to the blockchain node device of the service provider.

15. The computer-implemented system of claim 13, wherein executing predetermined service processing data acquisition logic comprises:

generating the service processing data based on the second transaction.

16. The computer-implemented system of claim 13, wherein a third node device in the blockchain uses the first transaction data to establish a data set corresponding to the target service object in a world state database of the blockchain based on the first transaction after being recorded in a first block of the blockchain, and the data set comprises the identifier of the target service object, and the third node device in the blockchain uses the second transaction to update the data set corresponding to the target service object in the world state database of the blockchain based on the second transaction after being recorded in a second block of the blockchain, and an updated data set comprises the identifier and the at least one piece of attribute data of the target service object.

17. The computer-implemented system of claim 16, wherein executing predetermined service processing data acquisition logic comprises generating the service processing data based on the data set corresponding to the target service object.

18. The computer-implemented system of claim 13, wherein the blockchain is a consortium blockchain, and the blockchain node device of the service platform and the blockchain node device of the service provider are node devices of consortium members in the consortium blockchain.

* * * * *